United States Patent Office 3,837,969
Patented Sept. 24, 1974

3,837,969
METHOD OF MAKING A TIRE BUILDING
SLEEVE AND SAID SLEEVE
Stanley M. Mezynski, Mogadore, Ohio, assignor to The Goodyear Tire & Rubber Company, Akron, Ohio
Continuation of abandoned application Ser. No. 767,325, Oct. 14, 1968. This application Mar. 29, 1972, Ser. No. 239,121
Int. Cl. B29h 17/16
U.S. Cl. 156—416                   5 Claims

ABSTRACT OF THE DISCLOSURE

This invention relates to a method of making sleeves or bladders for tire building machines for building bias angle tires, bias belted tires or radial ply belted tires by building the core of the sleeve of natural rubber, high cis polybutadiene, high cis polyisoprene, acrylonitrile-butadiene and butadiene styrene, and covering the outside of the core and at least part of the inside thereof with a layer of polyurethane elastomer.

---

This is a continuation of application Ser. No. 767,325, filed Oct. 14, 1968, now abandoned.

This invention relates to a method of making sleeves or bladders for tire building machines for building bias angle tires, bias belted tires and radial ply belted tires, and to said sleeves.

As tire building machines have become more automated the use of rubber sleeves containing fabric reinforcement which may be inflated to shape the tire or hold the rubber plies during the forming of the tire carcass has come into use. U.S. Pats. 3,268,382 and 3,078,204 teach the general nature of this tire building apparatus and the nature of the sleeves together with their function. Although these patents indicate unusual service life for the sleeves, it has been found that in actual service the sleeves develop cracks and fail otherwise with the average plant-wide production per sleeve being only three to four thousand tires before the sleeve has to be removed. Also, the sleeves conventionally used on these tire building machines are extremely stiff and difficult to remove from the tire building machine and hard to replace with a new one.

Therefore, an object of this invention is to provide a method of making sleeves which have improved service life and permits them to be placed on and removed from the tire building machine with greater ease.

Figure 1:
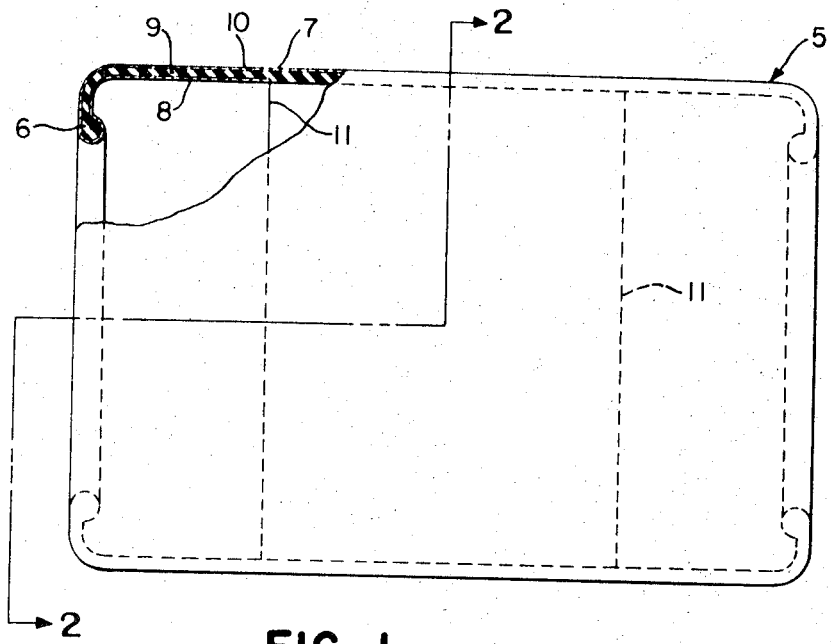
Figure 3:
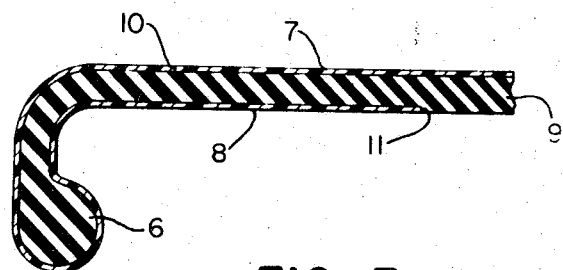
Figure 2:
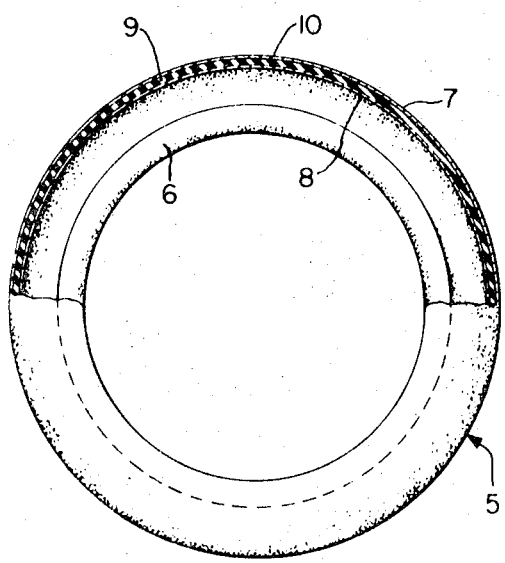

Further objects and advantages of this invention can be more readily understood by reference to the drawings wherein FIG. 1 is a perspective view of a sleeve for a tire building machine having part thereof broken away; FIG. 2 is a cross-sectional view along the lines 2—2 of FIG. 1 and FIG. 3 is an enlarged partial view of the part broken away in FIG. 1 to show the bead in operative contact with the tire drum and sleeve support members.

Referring to FIG. 1, the cylindrical, flexible, stretchable, resilient inflatable sleeve 5 is shown with a section cut away to display the details of the sleeve construction in the bead area 6, both outside 7 and inside 8 of the sleeve. The core or interior layer 9 of the sleeve is a cured compounded rubber stock that exhibits good cut and abrasion resistance. An outer layer of a polyurethane elastomer is applied over the sleeve core 9 to give a polyurethane outside coating 10 on the sleeve which preferably extends from bead to bead at each end of the sleeve. Also, it is desirable to have the polyurethane coating extend around beads 6 onto the inside surface 8 of the sleeve for part of the way, for example, about 6 to 18 inches to extend past those areas in contact with the drum of the tire building machine or over the entire inside surface of the sleeve.

The objects of this invention are achieved in one embodiment by forming the sleeve body of a suitable rubber which is compounded with relatively large amounts of carbon black either with or without fabric reinforcing and then applying a coating of polyurethane to the outside surface of the sleeve and preferably to the inside surface, too. Up to the point identified in FIG. 1 by numeral 11, usually about 6 to 18 inches from the bead or over the entire length of the inside surface 8 of the sleeve.

A sleeve is prepared in accordance with one embodiment by wrapping a nylon fabric coated with a compounded natural rubber stock around a sleeve building mandrel and then this is followed by a second layer of fabric coated with compounded natural rubber stock to form a two-ply composite band. This band was removed from the mandrel, placed in a curing mold and cured with steam. The cured sleeve is removed from the mold. The surface of the sleeve is cleaned with chlorine water and allowed to dry. The cleaned surface is then coated with a spray coat of liquid polyurethane reaction mixture to give a coating of about 2 to 100 mils and preferably about 5 to 15 mils.

A suitable compounded natural rubber stock can be prepared by the following recipe on a parts by weight basis:

| Ingredients: | Parts |
|---|---|
| Natural rubber: | |
| Smoked sheet | 40.00 |
| Brown sheet | 60.00 |
| Sulfur | 0.75 |
| Zinc oxide | 10.00 |
| Carbon black FEF | 30.00 |
| Asphaltic oil | 8.00 |
| Stearic acid | 3.50 |
| Polymerized trimethyl dihydroquinoline | 2.00 |
| Mixture of aryl-p-phenylene diamine | 1.00 |
| 4-morpholinyl-2-benzothiazoic disulfide | 2.00 |
| Total | 157.25 |

A compounded natural rubber stock of this type is particularly preferred as it gives a sleeve having considerable extensibility and thus permits the sleeve to be readily put on and taken off the tire building apparatus.

In a second embodiment a sleeve body for a passenger tire building apparatus was molded from a butadiene-acrylonitrile rubber compounded on the mill according to the recipe shown below:

| Ingredients: | Parts |
|---|---|
| Copolymer (55 parts butadiene, 45 parts acrylonitrile) | 100.00 |
| Zinc oxide | 5.00 |
| Magnesium carbonate | 1.00 |
| Sulfur | 2.00 |
| Carbon black | 80.00 |
| Stearic acid | 1.00 |
| Di-benzothiazyl disulfied | 1.60 |
| Polyvinyl chloride resin | 20.10 |
| Dioctyl phthalate | 4.15 |
| Tributyl citrate | 4.15 |
| Triglycol ester | 4.15 |
| Dibutyl phthalate | 5.00 |
| Total | 228.15 |

This compounded butadiene-acrylonitrile copolymer was then extruded into a continuous strip 3″ x 3″ and this strip was cut into a piece about 4′ long. This 4 foot-long strip was placed in a sleeve mold held at about 290 to 310° F. and the mold was closed to place the strip under sufficient pressure to squeeze or flow the compounded copolymer into the cavity of the sleeve mold, the maximum pressure under which the mold was placed being about 1600 pounds per square inch to effect flow of the compounded copolymer into the cavity of the mold and it was held under this pressure at a temperature of about 295 to 305° F. for about 20 minutes to cure the copolymer. At this time the mold was opened and the cured sleeve was removed from the mold and the sprues formed due to the place where the mold parts joined were cut away. This area was buffed to give the sleeve a relatively smooth contour. The outside surface of this sleeve and part of the inside up to about 18 inches from the ends thereof were cleaned with chlorine water and then washed with water and allowed to dry. As soon as the surface of the sleeve inside and out had dried it was given a spray coat of a polyurethane reaction mixture to build up a coating of about 10 mils thickness over the entire outside and inside surface of the sleeves for a distance of 18 inches from the ends thereof to give the finished passenger tire building apparatus sleeve.

Passenger sleeves made as above were used in PB passenger tire building machines to make tires and gave an improvement in service life relative to the sleeves in commercial use on the same type tire building machines of at least 42 percent and as high as 157 percent.

The polyurethane liquid reaction mixture used to spray coat the sleeve was prepared from a prepolymer. This prepolymer was prepared by reacting 2 mols of toluene diisocyanate with 1 mol of a polyester prepared by the condensation of adipic acid with an excess of a mixture consisting of 80 percent by weight ethylene glycol and 20 percent by weight propylene glycol. This prepolymer was used to prepare a masterbatch by ball milling 1250 parts of this prepolymer with 375 parts Cellosolve acetate, 125 parts carbon black and 375 parts of methyl ethyl ketone. The ball milling was continued until a uniform suspension was obtained.

Component 1 of the spray mixture was formed by mixing 165 parts of this black masterbatch with a mixture consisting of 1500 parts of the prepolymer, 450 parts Cellosolve acetate, 450 parts methyl ethyl ketone and 72 parts of a solution of cellulose acetate butyrate containing 10 percent by weight of a mixture containing 50 percent xylene and 50 percent methyl Cellosolve acetate. Component 2 of this sprayable mixture cimprises 153 parts of methylene-bis-ortho-chloroaniline and 153 parts of methyl ethyl ketone. Components 1 and 2 were mixed just prior to the time the spray coats were to be applied to form the sprayable polyurethane liquid reaction mixture. Normally the mixture of components 1 and 2 remained sprayable in excess of one hour.

The core of the sleeve can be made from those compounded and cured elastomers having good to excellent cut tear resstance, usually about 5 percent and a Shore A hardness of about 55 to 85 and preferably 65 to 80.

Representative examples of these elastomers are natural rubber, acrylonitrile-butadiene rubber, high cis-polybutadiene rubber, high cis-polyisoprene rubber and btuadiene styrene rubber.

Although the polyurethane coatings have been exemplified as being applied as a spray coat of a liquid polyurethane reaction mixture, they can also be applied by other methods such as brushing or dipping. Preferably the reaction mixture contains sufficient solvent to facilitate spreading with the solvent content varying from about 5 to 95 percent with the preferred amount being about 20 to 60 percent by weight.

In general, the polyurethane coating is applied as a liquid polyurethane reaction mixture with the polyurethane reaction mixture being prepared either by the one-shot, prepolymer or other methods for making said mixtures. The polyurethane reaction mixture comprises a reactive hydrogen containing material of about 700 to 10,000 molecular weight, an organic polyisocyanate and a cross-linking agent selected from the class consisting of the low molecular weight polyols such as the glycols and the organic diamines and the alcoholamines. A mol of the reactive hydrogen containing material is generally reacted with about 1 to about 2½ mols of the organic polyisocyanate to form a prepolymer. The prepolymer is reacted with a cross-linker, usually about 0.1 to about 1.1 mols with the preferred range being 0.5 to 0.9 mols of said crosslinker for each mol of excess organic polyisocyanate relative to the reactive hydrogen containing material. By proper choice of the crosslinker the Shore A hardness of the polyurethane can be made to vary from 30 to 80 with the preferred range being 45 to 65. The organic polyisocyanates that are normally used are toluene diisocyanate, methylene di(phenyl isocyanate) and the phosgenation product of the reaction of aniline with an aldehyde such as formaldehyde. The other organic polyisocyanates can also be used but the above enumerated ones are those that are most generally used commercially.

The reactive hydrogen containing material generally has a molecular weight of about 750 to 1000 and preferably 1000 to 4000 and comprises the polyester polyols, the polyether polyols, and the hydrocarbon polyols. In general, the polyester polyols are the reaction products of organic polycarboxylic acid and its anhydride with a glycol such as ethylene, propylene or tetramethylene. Preferably the polyester polyols has a molecular weight of about 1000 to about 3500 and contains two hydroxyls and in some cases three, with the preferred acids being those aliphatic dicarboxylic acids having from about 4 to 10 carbon atoms.

The polyether polyols may be those obtained by the condensation of an alkylene oxide having from 2 to 10 carbon atoms on a nucleus generating material such as a polycarboxylic acid or a glycol or a related polyol. The polyether polyols most readily available and utilized in this invention are the polypropylene ether glycols or triols and the poly tetramethylene ether glycols. The hydrocarbon polyols are those most readily obtained by the polymerization of an α-olefin to obtain a polymer which is hydroxyl terminated.

In addition to the cleaning of the sleeve core surface with chlorine water it is also desirable to treat the surface with a solvent solution of an organic polyisocyanate. A preferred solution for this purpose is one containing a ketone such as acetone, methyl ethyl ketone or methyl isobutyl ketone, having dissolved therein 1 to 20 percent by weight of an organic polyisocyanate with a preferred one being the phosgenated mixture obtained by phosgenation of the acid rearrangement product of the reaction of aniline and an aldehyde such as formaldehyde of the formula:

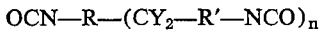

$$OCN-R-(CY_2-R'-NCO)_n$$

in which R and R' are arylene radicals, y is selected from the group consisting of H, alkyl, aryl radicals, N is a whole number and the $(CY_2-R'-NCO)$ groups in excess of one are attached to an R' radical. Best results are obtained where the phosgenation mixture has less than about 40 percent methylene diphenyl isocyanate content.

The term "sleeve" also includes bladders for center sleeves and turn-up sleeves for building conventional bias angle tires, bias belted tires and radial ply belted tires and is not necessarily related to a material of uniform cross-section as it is desirable with some tire building machines to have some portions of the bladder thicker than others to accent the movement of the bladder under inflation.

The fabric used to reinforce the sleeve core is the usual tire cord fabric such as polyester, polyamide, rayon, glass or cotton, materials which preferably are expansible.

While certain representative embodiments and details have been shown for the purpose of illustrating the invention, it will be apparent to those skilled in this art that various changes and modifications may be made therein without departing from the spirit or scope of the invention.

What is claimed is:

1. A sleeve for a tire building machine, including an inflatable body portion having dimensions suitable for attachment in operative relationship with a tire building machine, said body portion comprising an inner layer or core of a cured compounded elastomer selected from the class of rubber polymers consisting of natural, high cis-polybutadiene, high cis-polyisoprene, acrylonitrile-butadiene and butadiene styrene and an outer layer of a polyurethane elastomer which extends around the ends of the inner layer past at least the area that contacts the drum.

2. The sleeve of Claim 1 wherein the core contains an expansible fabric.

3. The sleeve of Claim 1 wherein the polyurethane elastomer has a Shore A hardness of about 45 to 65.

4. The sleeve of Claim 1 wherein the outer layer of a polyurethane elastomer is a reaction product of a reaction mixture composed of a reactive hydrogen containing material of about 1000 to 4000 molecular weight selected from the class of polyester polyols, polyether polyols and hydrocarbon polyols, an organic polyisocyanate and a crosslinking agent of low molecular weight polyols and organic diamines.

5. The sleeve of Claim 4 wherein a mol of reactive hydrogen containing material is used for each one to one and one-half mols of organic polyisocyanate and .5 to .9 mols of crosslinker for each mol of excess organic polyisocyanate relative to the reactive hydrogen containing material.

References Cited

UNITED STATES PATENTS

| | | | |
|---|---|---|---|
| 3,386,875 | 6/1968 | Grote | 156—416 |
| 3,671,358 | 6/1972 | Henley et al. | 156—401 |
| 3,268,382 | 8/1966 | Urban | 156—401 |
| 3,475,254 | 10/1969 | Henley | 156—416 |
| 3,483,062 | 12/1969 | Madge | 156—401 |
| 3,506,514 | 4/1970 | D'Avello et al. | 156—416 |
| 3,171,769 | 3/1965 | Henley et al. | 156—401 |
| 3,019,148 | 1/1962 | Hausch | 156—128 U |
| 3,373,143 | 3/1968 | Chilvers et al. | 156—128 U |

OTHER REFERENCES

Mobay Chemical Co., Technical Information Bulletin, TIB 62–E19, Jan. 23, 1961, pp. 1 and 2, Pittsburgh, Pa.

"Rubber World," T.S. 1870.544, vol. 144, No. 4, July 1961, pp. 67–71, Bill Brothers Publishing Corp., Philadelphia, Pa., "Urethane Rubbers Growing in Use," S. V. D'Adolf.

CLIFTON B. COSBY, Primary Examiner

U.S. Cl. X.R.

156—128 U, 131, 401